Jan. 30, 1934.  A. O. JAEGER  1,945,353
CATALYTIC APPARATUS
Filed Dec. 22, 1928  4 Sheets-Sheet 1

Inventor
Alphons O Jaeger
By Robert Ames Norton
Attorney

Jan. 30, 1934.  A. O. JAEGER  1,945,353
CATALYTIC APPARATUS
Filed Dec. 22, 1928   4 Sheets-Sheet 3

Inventor
Alphons O. Jaeger
By Robert Ames Norton
Attorney

Jan. 30, 1934.  A. O. JAEGER  1,945,353
CATALYTIC APPARATUS
Filed Dec. 22, 1928  4 Sheets-Sheet 4

Inventor
Alphons O. Jaeger
By Robert Ames Morton
Attorney

Patented Jan. 30, 1934

1,945,353

UNITED STATES PATENT OFFICE 1,945,353

CATALYTIC APPARATUS

Alphons O. Jaeger, Crafton, Pa., assignor to The Selden Company, Pittsburgh, Pa., a corporation of Delaware Application December 22, 1928
Serial No. 327,853

8 Claims. (Cl. 23—288)

This invention relates to catalytic apparatus and more particularly to catalytic apparatus for carrying out exothermic reactions or reactions which require very delicate temperature regulation.

In my prior Patent No. 1,660,511, dated February 28, 1928, I have described a converter system in which a plurality of catalyst zones or converters are used, the first being provided with cooling which is effected preferably by the reaction gases themselves and which cooling is sufficiently powerful to permit large overloads, followed by uncooled catalyst layers or converters or by those provided with less powerful reaction gas cooling. This operates very satisfactorily for converters up to a certain size and for certain reactions. For other reactions which are highly exothermic or especially where a different temperature is required in the first layers or converters than in later ones, such as the contact sulfuric acid process, it is not possible to obtain the desired temperature control in the zones provided with weak cooling in a manner sufficiently satisfactory for very large scale operation and in the case of reactions such as the contact sulfuric acid process where it is desired to maintain a very much lower temperature in the last layers or the last converters in order to permit high conversion equilibrium, the reaction gases themselves cannot be used as effectively for cooling the final layer as they are themselves at too high a temperature and must be cooled down by means of intercoolers or heat exchangers which add considerably to the bulk of the apparatus and make the temperature control in the last layers or converters difficult.

According to the present invention a plurality of catalyst layers or converters are provided, the first layer or converter being cooled by the reaction gases themselves and the second layer being provided with an independent cooling which, however, in some cases may be effected by reaction gases, but not after they have passed through the first layer. For convenience and space economy the various converters or catalyst layers are mounted in a single shell but it should be understood that this is not the only arrangement and separate converters may be used standing side by side, as shown diagrammatically in the patent referred to.

The catalytic apparatus of the present invention may be used for the most various vapor phase catalyses, such as:—the oxidation of benzol, toluol, phenol, tar phenols or furfural to maleic acid and fumaric acid; cresol to salicylaldehyde and salicylic acid; toluol and the various halogen and nitro substituted toluols to the corresponding aldehydes and acids; xylenes, psuedocumene, mesitylene, paracymene and other derivatives to the corresponding aldehydes and acids; naphthalene to alphanaphthaquinone, phthalic anhydride and maleic acid; phthalic anhydride to maleic acid and fumaric acid; anthracene to anthraquinone; phenanthrene to phenanthraquinone, phthalic anhydride and maleic acid; acenaphthene to acenaphthylene, acenaphthaquinone, bisacenaphthylidenedione, naphthaldehydic acid, naphthadehydic acid, naphthalic anhydride and hemimellitic acid; fluorene or dehydrogenated fluorenes to fluorenone; eugenol and isoeugenol to vanillin and vanillic acid; methyl alcohol and methane to formaldehyde; ethyl alcohol to acetic acid; ethylene chlorhydrine to chloracetic acid.

Organic oxidations in which impurities are selectively burned out or transformed into easily removable substances also require accurate control; examples of such reactions are the purification of crude anthracene or pheanthrene by the selective catalytic combustion of carbazol, the purification of crude naphthalene, crude mononuclear aromatic hydrocarbons and crude aliphatic compounds, such as high sulfur oils and motor fuels.

Ammonia from coal tar may also be purified by selective oxidation of organic and other impurities and requires a good temperature control. The apparatus is also suitable for the oxidation or synthesis of ammonia.

The apparatus of the present invention is also suitable for other types of exothermic vapor phase catalyses, such as catalytic reductions, hydrogenations, condensations and the like, and for high pressure reactions and special reactions such as the catalytic purification of gases, catalytic water gas process, synthesis of hydrocyanic acid, production of reduction products of oxides of carbon, such as, for example, methanol, various motor fuels and the like. Examples of reductions are:—reduction of nitro compounds to amines, for instance nitro benzol to aniline, etc., the reduction of phenols to cyclohexanols, naphthalene to tetraline, etc., crotonaldehyde to normal butyl alcohol, acetaldehyde to ethyl alcohol, etc.

The catalytic apparatus of the present invention is particularly suited for the contact sulfuric acid process where it permits obtaining high reaction temperature and correspondingly high reaction velocity in the first layers or converters, coupled with a lower temperature for best conversion equilibrium in the later layers or converters. The invention will, therefore, be described more particularly in connection with the contact sulfuric acid process but it should be understood that what is stated with regard to this process is applicable to other exothermic vapor phase catalyses, such as those enumerated above.

The invention will be described in greater detail in connection with the drawings, in which.

It should be understood that the drawings are purely diagrammatic in nature and accessories, such as insulation, temperature measuring devices, etc., have been omitted for the sake of simplicity, but in an actual installation, of course, all such suitable details will be provided by the skilled engineer.

Figure 1:
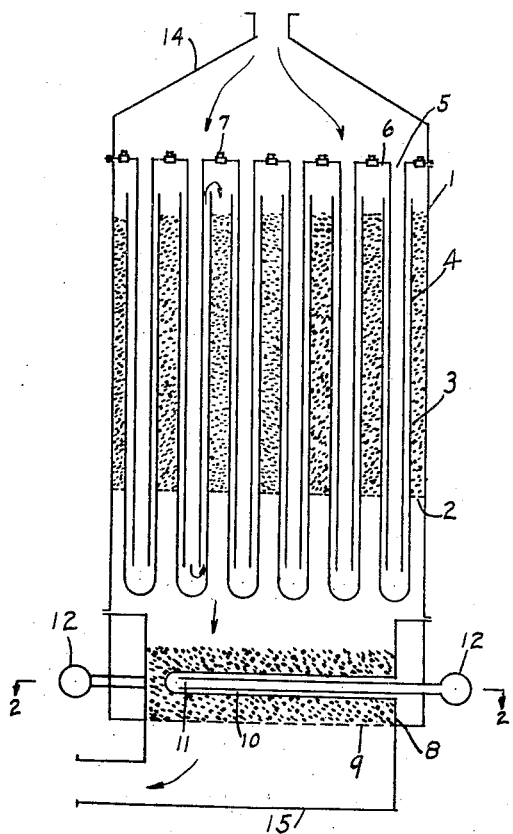
Fig. 1 is a vertical section through a converter system provided with an internal heat exchanger.

In the modification shown in Fig. 1, the first layer or converter is enclosed in the shell 1, the catalyst 3 resting on the screen 2. Closed-end tubes 4 extend through the catalyst and below the screen 2 and open-end tubes 5 depending from a tube-sheet 6 extend substantially to the bottom of the closed-end tubes 4. The tube-sheet 6 is provided with suitable plugs 7 for filling in catalyst. A somewhat constricted lower portion of the shell 8 is provided for the second catalyst layer or converter which is supported by the screen 9 and through which double countercurrent heat exchange elements consisting of closed-end tubes 10 and open-end tubes 11 pass horizontally. The open-end tubes 11 are connected to the manifold 12, whereas closed-end tubes are connected to the manifold 13. The converter system is also provided with a top piece 14 and bottom piece 15.

In operation the gases, for example a mixture of sulfur dioxide and oxygen-containing gases, enter the top piece 14 and, if desired, may be suitably baffled and then pass downwardly through the open-end tubes 5 where they are in indirect heat exchanging relation with the catalyst. On reaching the bottom of the closed-end tubes, the flow of gases is reversed, passing up through the annular space between the open-end tubes 5 and the closed-end tubes 4, during which flow they are in direct heat exchanging relation with the catalyst and with the incoming gases and then, after a second reversal of flow, they pass downwardly through the catalyst layer. Thence, after passing over the lower portion of the double countercurrent heat exchanger, they flow through the second layer or converter, the temperature of which is regulated by circulating a cooling gas, such as, for example, air, through the manifold 12, the double counter current heat exchanging elements defined by the open-end tubes 11 and closed-end tubes 10, and out through the manifold 13. After passing through the second catalyst layer or converter, the gases enter the bottom piece 15 and pass out through the exit connection shown. During the passage through the first layer or converter, the gases are subjected to such an effective heat exchange, owing to the high velocity and long travel, that the cooling effect of the incoming gases is substantially proportional to their quantity within very wide limits and as the heat evolved by the reaction which takes place when the gases pass through the catalyst layer is also substantially proportional to the amount of gases flowing through it will be evident that a uniform cooling is achieved even with wide fluctuations in the quantity of reaction gases flowing through the converter system. In reactions such as the contact sulfuric acid process, it is desirable to have a high temperature in the first converter or catalyst layer in order to assure high reaction velocity but this temperature should then be reduced before passing through the last converter or layer in order to provide for best temperature equilibrium. This is also in part effected by the contact of the gases leaving the first catalyst layer with the portions of the double countercurrent heat exchange elements extending below the screen 2 and acting as an internal heat exchanger. The temperature in the second catalyst layer or converter is then accurately adjusted by a proper proportioning of the cooling gas through the double countercurrent heat exchange elements provided in the layer and by the temperature of the cooling medium. It is thus possible to maintain the second converter or layer at a very much lower temperature than the first layer and in this manner the most desirable temperatures for high reaction velocity on the one hand and excellent conversion equilibrium on the other are satisfactorily obtained.

Instead of extending the double countercurrent heat exchange elements in the first layer or converter below the screen 2, they may be confined to the catalyst layer itself, in which case their cooling effect is the same but they do not serve to reduce the temperature of the gases leaving the screen 2.

Instead of using double countercurrent heat exchange elements in the 2nd layer or converter, straight tubes may be used but such tubes are less efficient temperature regulating elements. If desired, the second converter or layer may, of course, be in a separate shell placed beside the first converter or layer instead of underneath it. The operation is, of course, identical and the choice of construction is decided almost wholly by questions of space and construction economy.

It will be noted that not only is it possible to operate with the optimum temperatures in both converters or catalyst layers but it is also possible to vary the velocity of gas flow and time of contact in the different layers or converters. Ordinarily a shorter time of contact is desired in the upper layer than in the bottom layer. This is normally effected by reason of the fact that the heat exchange elements are placed very close in the upper layer and are less closely placed in the bottom layer. This is not brought out in the diagrammatic drawing where, for the sake of clearness, in Figs. 1 and 2 the double countercurrent heat exchange elements are shown widely spaced. In actual practice, they are very closely spaced and the amount of catalyst between them is correspondingly smaller with a resulting high velocity of reaction gas flow therethru and short time of contact. The proper times of contact in the various converters or layers are, of course, figured out by the skilled chemist for any particular reaction and it is an advantage of the present invention that the converter system is flexible enough to permit obtaining optimum conditions in this important connection.

Figure 2:
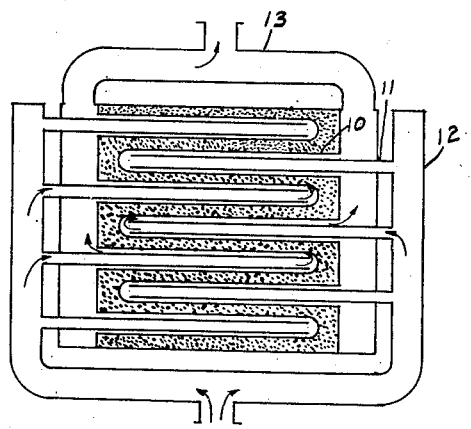
Fig. 2 is a horizontal section along the line of 2—2 of Fig. 1.
Figure 3:
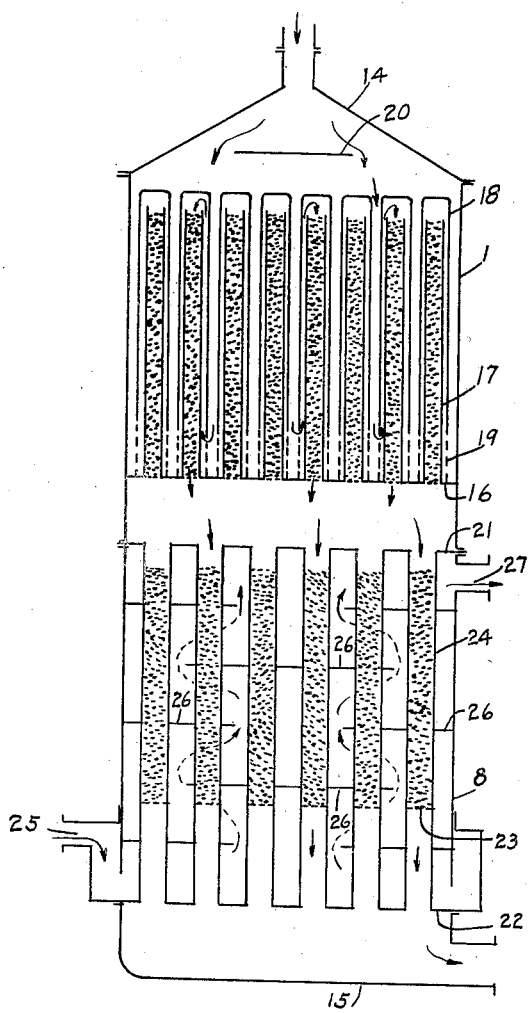
Fig. 3 is a vertical section through a modified type of converter system.

Fig. 3 illustrates a converter system having somewhat different component parts than that shown in Figs. 1 and 2 but operating on the same principle. The upper converter or layer, as in Fig. 1, contains a shell 1 and top piece 14. A tube sheet 16 is provided toward the bottom of the shell from which rise tubes 17 which are filled with catalyst. Closed-end tubes 18 with perforations 19 at their bottom ends are placed over the catalyst tubes, closely surrounding the same. A baffle 20 is also provided in the top piece 14 for better mixture of the gases. The lower converter consists in a shell 8, upper and lower tube sheets 21 and 22 respectively, connected by tubes 24 filled with catalyst, retained on individual screens 23. A bottom piece 15 is also provided. Cooling gas enters the shell 8 through the opening 25, passes over the tubes 24, after being deflected by baffles 26, and finally passes out through the outlet 27.

In operation reaction gases enter the top piece 14, are distributed by the baffle 20, and pass down over the closed-end tubes 18, being in indirect heat exchanging relation with the catalyst in the tubes 17. On reaching the perforations 19, the gases enter the annular space between the tubes 18 and the tubes 17, reversing their flow and pass upwardly in direct heat exchanging relation with the catalyst and the tubes and with the gases flowing outside of the tubes 18, and finally reverse their flow again and pass down through the catalyst in the tubes. Then the gases pass through the catalyst in the tubes 24 and out through the bottom piece 15. It will be noted that the temperature control in the top converter is the same as in Fig. 1, that is to say it increases proportionately to the reaction gas flow and a double countercurrent heat exchange takes place although the relative position of catalyst and heat exchange elements is reversed. An extraordinarily effective temperature control is achieved as the catalyst tubes may be chosen as small as desired. The lower converter has its temperature controlled by a cooling gas and can be adjusted to any desired temperature without relation to that obtaining in the top converter.

Of course, the lower converter of the type shown in Figs. 1 and 2 may be used with an upper converter as shown in Fig. 3 and vice versa. In fact the particular association of one type of reaction gas cooled converter with another type of independently cooled converter is merely to illustrate the flexibility of the invention and other different arrangements may be employed.

Figures 4, 5:
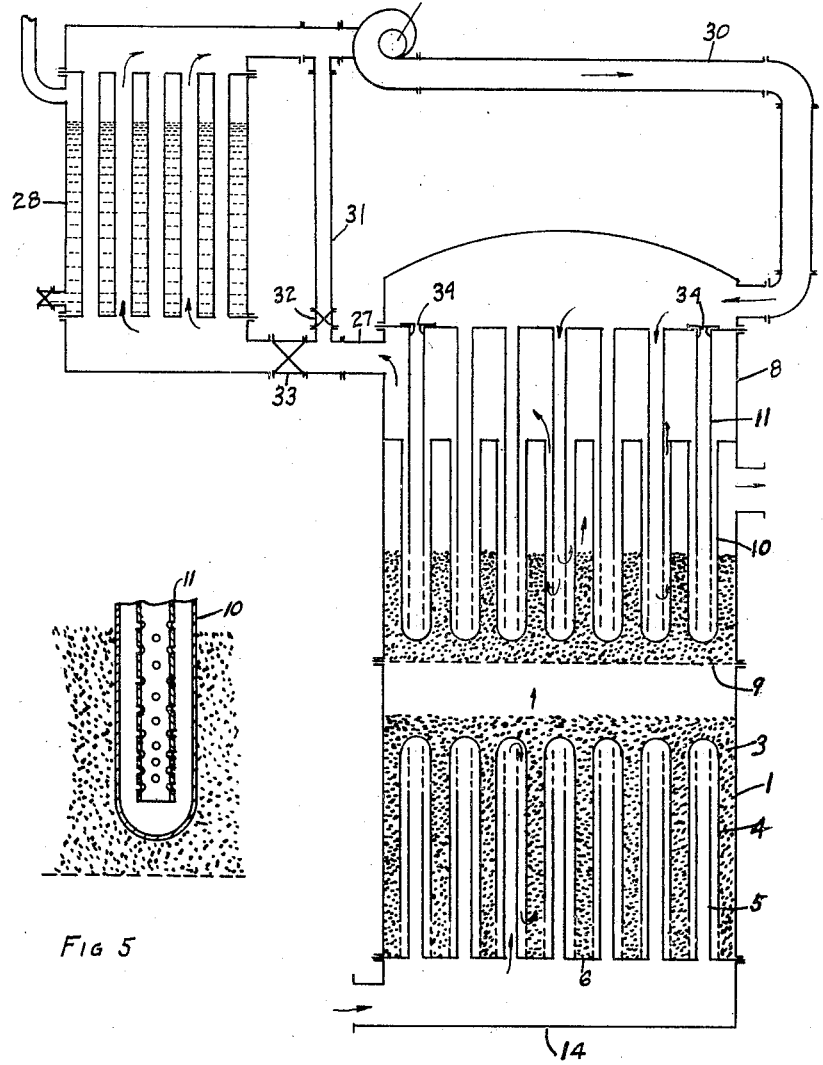
Fig. 4 is a vertical section through a converter system provided with closed circuit cooling of the second layer.
Fig. 5 is a detail of the cooling element design shown in Fig. 4.

Fig. 4 illustrates a somewhat modified type of converter construction from that in Fig. 1, the gases passing first through a lower converter and then through an upper, instead of the reverse. The lower converter contains double countercurrent heat exchange elements of the same type as in Fig. 1 except that they are inverted. The same reference characters are used to designate the same parts. The upper converter is likewise provided with double countercurrent heat exchange elements but instead of their being arranged horizontally as in Figs. 1 and 2 they are arranged vertically. Like parts bear like numerals. The cooling medium after passing through the double countercurrent heat exchange elements in the second layer flows out through a pipe 27, thence through a cooler 28, shown diagrammatically as a fire tube boiler, and are finally recirculated by the pump 29, through the pipe 30, back through the double countercurrent heat exchange elements. A by-pass 31 is provided around the cooler 28 and the amount of gas by-passed is controlled by a valve 32 in the pipe 31 and a valve 33 in the pipe 27.

Even with effective heat insulation, the shells of the converters have a certain cooling effect and this may be compensated for by cooling the center of the catalyst layer in the converter more strongly than the periphery. This is shown in Fig. 4 by orifice plugs 34 which restrict the flow of gas in the heat exchange elements in the upper converter. Similar restrictions causing an increased flow from the periphery toward the center may be applied to the double countercurrent heat exchange elements in the lower converter or in the upper converter shown in Fig. 1. The variation in cooling capacity thus effected is not claimed here broadly but only in connection with the present combination of converters. The invention is described and claimed for all types of converters in my prior Patent No. 1,685,672, dated September 25, 1928. Any of the modifications therein described may be utilized.

Fig. 5 is a detail of the double countercurrent heat exchange elements shown in Fig. 4 and illustrates that the inner-tube may be perforated in order to prevent the gases from striking the closed end of the closed-end tubes in sufficient quantity to produce a cold spot, which is undesirable as it makes for non-uniform catalyst operating temperatures.

Figure 6:
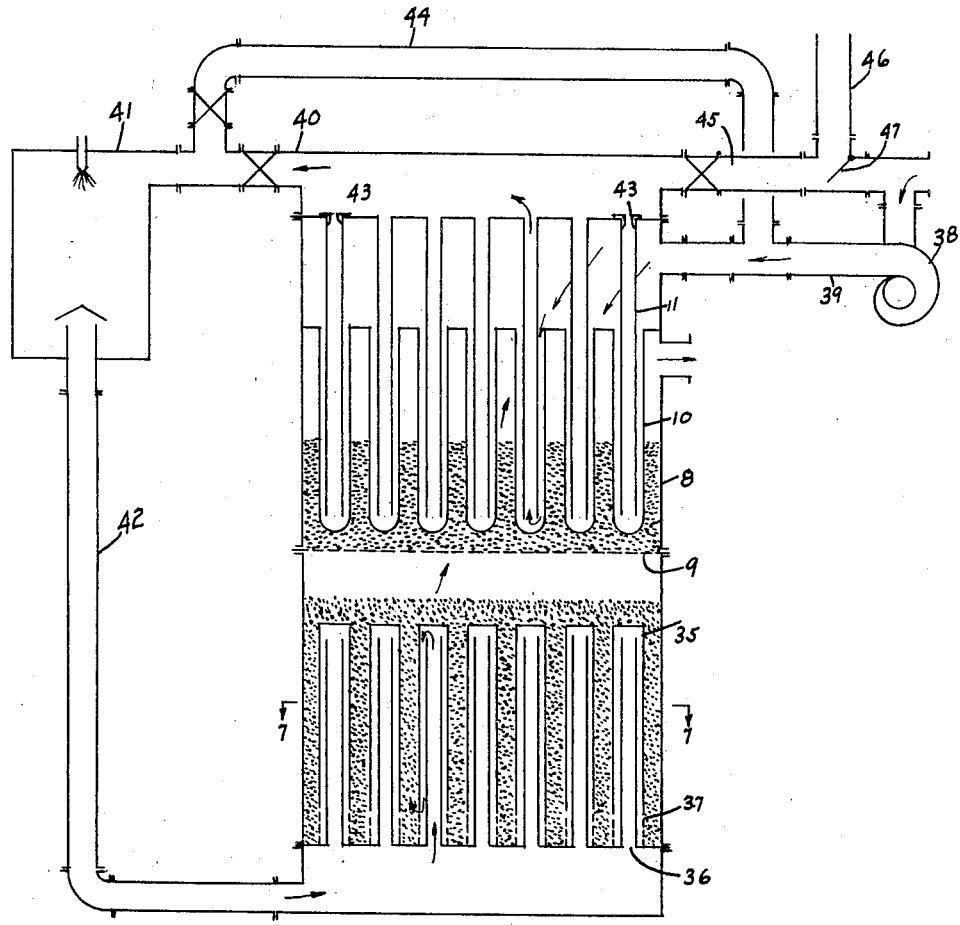
Fig. 6 is a vertical section through a converter system illustrating the use of reaction gas for cooling the second layer and also illustrating a different modification of cooling the first layer.

Fig. 6 illustrates a converter in which the flow of gas is the same as that in Fig. 4, the upper converter being provided with double countercurrent heat exchange elements as in Fig. 4 and bearing the same reference characters. The bottom converter is provided with a different type of double countercurrent heat exchange elements in the form of concentric annuli 35 and 36 respectively nesting one within the other, the catalyst being placed in the space between the annuli 35. These annuli are also provided with perforations 37 at their open ends so that gases may pass out into the catalyst. It will be noted that the flow of gases is the same as in the modification shown in Figs. 1 and 4, that is to say the gases first pass between the annuli 36 in indirect heat exchanging relation with the catalyst, then reverse their flow and pass down in the annular spaces between the annuli 35 and 36 in direct heat exchanging relation with the contact mass and with the incoming gas, and thence, after reversal of flow, through the perforations 37 and up through the catalyst layer. The construction shown in Figs. 6 and 7 possesses, however, some advantages as the rings nest without the use of tube sheets and the catalyst in the annuli presents a larger surface to the heat exchange elements than is the case with the design shown in Figs. 1 and 4. Compensation for converter shell cooling may be effected by increasing the thickness of catalyst annuli from the center to the periphery or by providing suitable restrictions in the gas flow through the various portions.

It should be noted that the design of converter shown in the first layer or converter in Figs. 1, 4 and 6 presents a great advantage in that tight connections are not necessary. It will be apparent that any small leakages of gas will merely cause a slightly smaller quantity to pass through the heat exchange elements and the leakages do not pass outside the converter. This is a marked contrast to the old fashioned tubular converter, such as, for example, that illustrated in the bottom converter of Fig. 3 where tightness of the tubes is essential and is frequently a troublesome matter as converters are operated at high temperature and warping is always to be feared.

Figure 7:
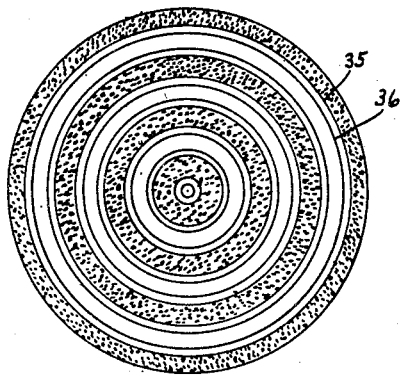
Fig. 7 is a horizontal section along the line of 7—7 of Fig. 6.

In addition to the modification in the bottom converter shown in Figs. 6 and 7, Fig. 6 shows the use of the heat exchange elements in the top converter to preheat incoming reaction gases. This is effected by causing the incoming reaction gas forced by the blower 38 to pass through the pipe 39 and then through the double countercurrent heat exchange elements and finally out through the valved pipe 40 to the chamber 41 where the material to be treated may be volatilized. This chamber is shown in purely diagrammatic form and will vary, of course, with the nature of the material used. Thus, for example, in the oxidation of sulfur dioxide to sulfur trioxide it may be a sulfur burner or in the case of organic oxidations and other vapor phase catalyses or other catalyses involving volatile organic compounds it may be a vaporizer of any desired type. The representation is, of course, purely diagrammatic and does not define any particular structural design. After the reaction gases have been formed, they pass through the pipe 42 into the converter, passing through in the same manner as in the converters described in Figs. 1 and 6.

The flow through the double countercurrent heat exchange elements in the upper converter or layer, which it will be noted is the reverse of the usual flow, that is to say the gases pass first through the annular space and then out through the central tubes, may be suitably distributed by means of orifice plugs 43 or other restrictions so as to compensate for converter shell cooling as described in connection with some of the other figures. Obviously, of course, if desired, the arrangement can be such that the gases flow through the double countercurrent heat exchange elements in the reverse direction. The cooling may be controlled by varying the speed of the blower or by by-passing a proportion of the cooling medium through the valved by-pass pipe 44. In some cases, for example when starting up, it may be desirable to bypass the whole of the gases. In case of shut-down of the lower converter or layer, gases may be directly by-passed by causing them to enter through the valved pipe 45. This also permits reversing the flow of gases through the double countercurrent heat exchange elements if desired since if the valve in pipes 45 and 44 are opened and the valve in pipe 40 is closed, gas passing in through the pipe 45 will go down through the central tubes and then up through the annular spaces between the central tubes and the closed end tubes and, finally, out through the pipe 39 and pipe 44.

The piping arrangement which provides for the preliminary heating up of part or all of the reaction gases by using them as cooling media for the second converter may, of course, be applied to the designs shown in any of the other figures. The piping is, of course, shown diagrammatically and the proper arrangement will be used to produce the flow which the skilled chemical engineer may deem most advantageous for the particular installation. Of course the piping in practice will usually be insulated, as will the converter, and all such design features which are ordinarily used in converter systems will be applied but their particular construction, of course, forms no part of the present invention and is, therefore, omitted for the sake of clearness. It is sometimes desirable to circulate a gaseous medium through the heat exchange elements of the second converter temporarily without causing it to pass through the chamber 41; thus, for example, when the converter is being heated up it may be desirable to pass hot gas of any nature through the heat exchange elements in order to heat up the catalyst in the upper converter. This may be very easily effected by closing the valves in pipes 40 and 44 and opening the valve in pipe 45. In such a case the gas will be forced by the blower through the heat exchange elements and will pass out through the pipe 45 and through a branch exhaust pipe 46, the check valve 47 being provided to prevent the gas from again circulating through the blower. Any other suitable piping arrangement may be applied which will permit using a temporary circulation and is included in the scope of the invention.

A few modifications of the present invention have been shown, which will illustrate its flexibility and application to vapor phase catalytic reactions. The advantages of exact control of temperature in both the converters is, of course, of great importance as has been brought out above. In some cases it may be desirable to provide further additional converters or catalyst layers which may possess other types of cooling or no cooling means at all. The addition of further converters in series is included within the scope of the present invention and the number of converters to be used will be determined in every case by the requirements of the reaction and by the particular structural design of the converters. For some reactions it is desirable to have a very short time of contact with the catalyst, and a larger number of converters in series permit relatively short contact times in any one converter with sufficient total time to effect the reaction. These modifications of structure, design and arrangement, of course, will depend on the particular reaction to be carried out and the most effective and suitable arrangement will in every case be chosen.

In some reactions it is desirable to recirculate the reacted products with or without removal of part of the products. Such systems of recirculation are described in my co-pending application Serial No. 256,620, filed February 20, 1928 and are applicable to the converter systems illustrated in the present invention. The piping arrangement for recirculation will be clear and has not been specifically illustrated as the particular design to be used does not form a particular part of this invention. Any suitable type of recirculation, such as those described in my co-pending application, may be used.

The term "catalyst layer" is sometimes used loosely in technical practice to refer either to one of a plurality of individual converters, each capable of effecting a complete stage of one reaction, when these are superimposed and retained within a common shell or to refer to a plurality of layers of catalyst within the same converter and having the same cooling system. In the present specification and claims this term is given only the first meaning referred to unless otherwise specified, while the term "converter", is given its customary meaning and refers to an individual converter or catalyst layer whether in the same shell with another or having its own individual shell.

What is claimed as new is:

1. Catalytic apparatus comprising in combination an automatic gas cooled converter containing a catalytic chamber, a catalyst layer therein, heat exchanging elements at least partially embedded in the catalyst layer, means for causing reaction gases to circulate through the heat exchanging elements out of direct heat exchanging relation with the catalyst, means for causing the gases to reverse their flow in the heat exchanging elements and to pass in reverse flow through portions of the elements in direct heat exchanging contact with the catalyst, means for deflecting gases issuing from the heat exchanging elements through the catalyst, a converter provided with positive cooling means at least partially embedded in the catalyst operated by a cooling medium other than the reaction gases issuing from the first converter, and means for causing the reaction gases to pass in series first through the automatic gas-cooled converters and then through the last named converter.

2. Catalytic apparatus comprising in combination an automatic gas cooled converter containing a catalytic chamber, catalyst therein, a gas permeable bottom supporting said catalyst, a gas impermeable partition above the catalyst layer, upright tubes having closed bottoms, at least a portion of the tubes being embedded in the catalyst and the open end being below the gas impermeable upper partition, open ended tubes passing downwardly through the upper partition into the closed end tubes and extending for a substantial distance therein below the level of the catalyst layer, means for causing reaction gases to pass downwardly through the open ended tubes, upwardly through the closed ended tubes, a converter provided with positive cooling means at least partially embedded in the catalyst operated by a cooling medium other than the reaction gases issuing from the first converter, and means for causing the reaction gases to pass in series first through the automatic gas-cooled converters and then through the last named converter.

3. In a converter system the improvement which comprises in combination at least one converter provided with a catalyst and with reaction gas operated cooling means, which cooling means provide a cooling effect which increases rapidly with increase in reaction gas velocity through the converter and which cooling means are sufficient to permit the converters to operate at loadings largely in excess of normal for commercial yields, a converter of lower heat dissipating capacity containing heat exchange elements at least partly embedded in the catalyst positively cooled by heat exchange with at least one component of the reaction gases passing to the first converter, and connections between the outlet of the powerfully cooled converters and the inlet of the converter of lower cooling capacity.

4. The process of effecting exothermic vapor phase catalytic reactions which comprises passing a reactive gas mixture at reaction temperatures through a converter provided with a catalyst and with cooling means sufficient to permit it to operate at loadings largely in excess of normal for commercial yields, and then passing the mixture through a final converter provided with a catalyst and with positive cooling means at least partially embedded therein, operated by a cooling medium other than the reaction gases issuing from the first converter.

5. The process of effecting exothermic vapor phase catalytic reactions which comprises passing a reactive gas mixture at reaction temperatures through a converter provided with a catalyst and with reaction gas operated cooling means, which cooling means provide a cooling effect which increases rapidly with increase in reaction gas velocity through the converter and which cooling means are sufficient to permit the converter to operate at loadings largely in excess of normal for commercial yields, and then passing the mixture through a final converter provided with a catalyst and with positive cooling means at least partially embedded therein, operated by a cooling medium other than the reaction gases issuing from the first converter.

6. The process of effecting exothermic vapor phase catalytic reactions which comprises passing a reactive gas mixture at reaction temperatures through a converter provided with a catalyst and with cooling means which provide a cooling effect increasing substantially in proportion to the reaction gas velocity through the converter, said cooling means being of sufficient capacity to permit the converter to operate at loadings largely in excess of normal for commercial yields, and then passing the mixture through a final converter provided with a catalyst and with positive cooling means at least partially embedded therein, operated by a cooling medium other than the reaction gases issuing from the first converter.

7. The process of effecting exothermic vapor phase catalytic reactions which comprises passing a reactive gas mixture at reaction temperatures through an automatic gas cooled converter containing a catalyst layer, the incoming gases passing first in indirect heat exchanging relation with interior portions of said catalyst layer, reversing their flow and passing in direct heat exchanging relation with said catalyst layer and with the incoming gases, and again reversing their flow and passing through the catalyst, and then passing the mixture through a final converter provided with a catalyst and with positive cooling means at least partially embedded therein, operated by a cooling medium other than the reaction gases issuing from the first converter.

8. The process of effecting exothermic vapor phase catalytic reactions which comprises passing a reactive gas mixture at reaction temperatures through a converter provided with a catalyst and with reaction gas operated cooling means providing a cooling effect which increases rapidly with increase in reaction gas velocity through the converter, which cooling means are sufficient to permit the converter to operate at loadings largely in excess of normal for commercial yields and then passing the mixture through a final converter provided with a catalyst and with positive cooling means extending parallel to the direction of gas flow through the catalyst and at least partially embedded therein, operated by a cooling medium other than the reaction gases issuing from the first converter.

ALPHONS O. JAEGER.